United States Patent
Goff et al.

[11] Patent Number: 5,999,340
[45] Date of Patent: Dec. 7, 1999

[54] MAGNIFIER STAND

[75] Inventors: James A. Goff, Webster; Richard J. Stryker, Scottsville; Howard Scott Ryan, Skaneateles, all of N.Y.; Carl Fisherman, Franklin Lake, N.J.

[73] Assignee: Baush & Lomb Incorporated, Rochester, N.Y.

[21] Appl. No.: 09/177,639

[22] Filed: Oct. 23, 1998

[51] Int. Cl.⁶ .............................. G02B 27/02; G02B 7/02
[52] U.S. Cl. ............................................ 359/804; 359/822
[58] Field of Search .................................... 359/382, 384, 359/802, 804, 805, 822

[56] References Cited

U.S. PATENT DOCUMENTS

| | | | |
|---|---|---|---|
| 597,758 | 1/1898 | Bausch | 359/817 |
| 839,599 | 12/1906 | Kemler | 359/816 |
| 1,612,693 | 12/1926 | Bausch | 359/817 |
| 1,702,317 | 2/1929 | Rose | 359/807 |
| 2,682,806 | 7/1954 | Gordenier | 359/817 |
| 3,774,993 | 11/1973 | Senff | 350/243 |
| 4,120,564 | 10/1978 | Rios | 359/806 |
| 4,190,322 | 2/1980 | Wortley | 350/181 |
| 4,336,916 | 6/1982 | Blanchard | 248/471 |
| 4,379,618 | 4/1983 | Tall | 350/239 |
| 4,923,282 | 5/1990 | Spitzberg | 350/245 |
| 4,944,574 | 7/1990 | Roote et al. | 350/245 |
| 4,958,907 | 9/1990 | Davis | 350/243 |
| 5,119,239 | 6/1992 | Iaquinto et al. | 359/811 |
| 5,267,716 | 12/1993 | Friedman | 248/291 |
| 5,351,424 | 10/1994 | Schulle et al. | 38/102.1 |
| 5,493,451 | 2/1996 | Cosey | 359/817 |
| 5,610,770 | 3/1997 | Galiani | 359/807 |
| 5,873,171 | 2/1999 | Hsu | 33/484 |

Primary Examiner—Georgia Epps
Assistant Examiner—Ricky Mack
Attorney, Agent, or Firm—Mary Anne Magee

[57] ABSTRACT

A stand for use with a magnifying device having a base plate, a supporting member and a magnifier holder. The stand may hold the magnifier at two different angles to the viewing surface as well as fold into a flat, compact package. The magnifier may be a retractable, lighted magnifier.

10 Claims, 7 Drawing Sheets

MAGNIFIER STAND

BACKGROUND OF THE INVENTION

The present invention generally relates to a stand for use with a magnifying device and more particularly to a stand which may hold a retractable lighted magnifier. The stand may hold the magnifier in diverse positions as well as folding into a flat, compact package.

There are various types of magnifiers available to the public. Magnifiers can be used for reading, craftwork, material inspection and the assembly of small parts. Some are hand held while others are mounted on stands.

As an example, U.S. Pat. No. 4,120,564 discloses a reading stand with a magnifier mounted on a frame. A holder on the base carries the reading material. The stand is formed by triangular side frames upstanding from the base. The magnifier lens resides at an angle to the base while the reading material is perpendicular to the base. The user would look down at an angle to view the reading material.

Other devices for viewing printed materials are described in U.S. Pat. Nos. 4,379,618 and 5,610,770. U.S. Pat. No. 4,379,618 describes a magnifier viewer and book holder, in which the base is one piece and is formed to have a flat front portion, an abutment, an inclined portion and a downwardly extending portion. The base of the magnifier inserts into the flat front portion. The magnifier maintains parallel, uniform spacing in relationship to the book which rests on the inclined portion. U.S. Pat. No. 5,610,770 discloses a magnification system which positions a lens in spaced relation to printed material such as a menu or a map.

Other examples of magnifiers which may be used for small detailed work including craftwork and assembly of small parts include pocket type magnifiers as shown in U.S. Pat. Nos. 839,599; 1,612,693; 1,702,317 and 2,682,806. U.S. Pat. No. 839,599 describes a device consisting of 2 rings connected by a member to which a spring is attached. This device can be used as an eyeglass, reading glass, or a standing magnifier and folds into a compact position allowing for easy carrying in a pocket. U.S. Pat. No. 1,612,693 also describes a pocket type of magnifying glass. The frame consists of three parts which when folded compactly, protect the lens. U.S. Pat. No. 1,702,317 describes a magnifying apparatus which allows for comparison of small objects by viewing them in two side-by-side depressions in the base. The magnifier is parallel to the base. Additionally, the apparatus folds flat as its components are hinged together. The pocket magnifying components of U.S. Pat. No. 2,682, 806 are also hinged, folding flat to protect the lens. The lens is parallel to the surface, supported by both legs.

A footed stand which supports a hand-held magnifier is described in U.S. Pat. No. 4,336,916. The stand, preferably spring steel, is retractable into the hollow, tube-like handle. When extended, the stand diverges to form two feet. The stand holds the magnifier in perpendicular position to the surface upon which it rests.

All of the above-cited art show magnifiers limited in their use due to single-use type of stands. None of them can be adapted to be used in alternate positions. This can severely limit the user and require that the user keep multiple magnifiers for different purposes.

The present invention is adapted for a cooperative relation with a magnifier which is normally hand-held and can still be used as such while inserted in the stand. It is ideally suited for use with the type of magnifying device having a retractable lens. The stand can be used to maintain the magnifier in 2 different positions, allowing the user more flexibility. The stand can also fold into a flat, compact form and can be conveniently carried in a shirt or pants pocket or in a purse.

SUMMARY OF THE INVENTION

An object of the present invention is to provide a support means for a magnifying device. The magnifier is detachably inserted into the stand and may be removed at any time. The stand may be used in two positions. The first position puts the magnifying device in a horizontal position to the base which allows the user to view objects from above. The second position is an easel position which angles the magnifying device, for example, at a 45° angle to the base. This allows the user to view objects in a downward position without being directly over the magnifying lens. The stand is collapsible in that it folds flat; the magnifier may be used while the stand is collapsed.

BRIEF DESCRIPTION OF THE DRAWNG

DETAILED DESCRIPTION OF THE INVENTION

The stand consists of three parts: a base plate 10, a vertical supporting member 30 and a magnifier holder 50 pivotally connected together by means which will be further described.

Figure 1:
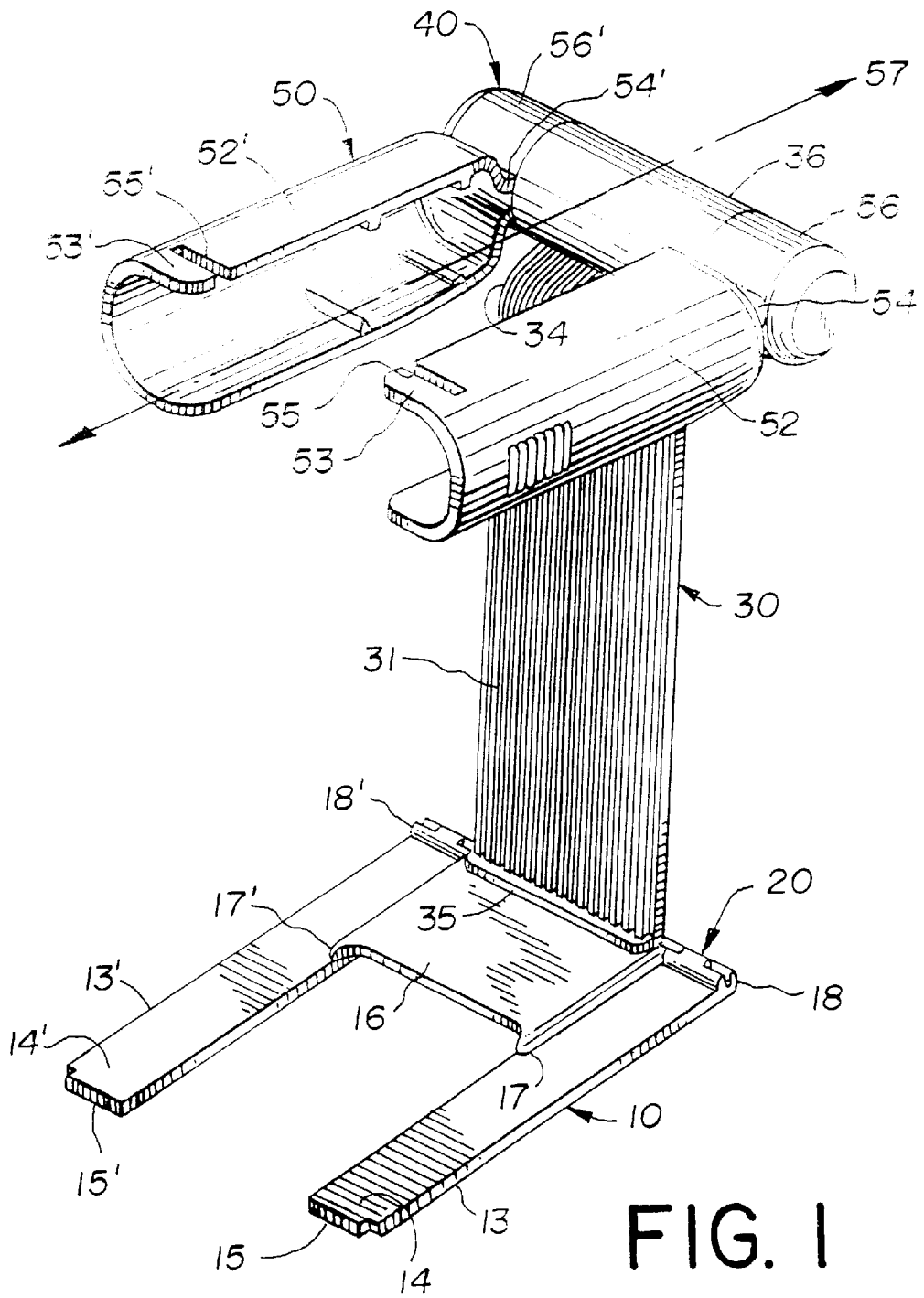
FIG. 1 is a perspective view of the stand assembled in the horizontal position.
Figure 2:
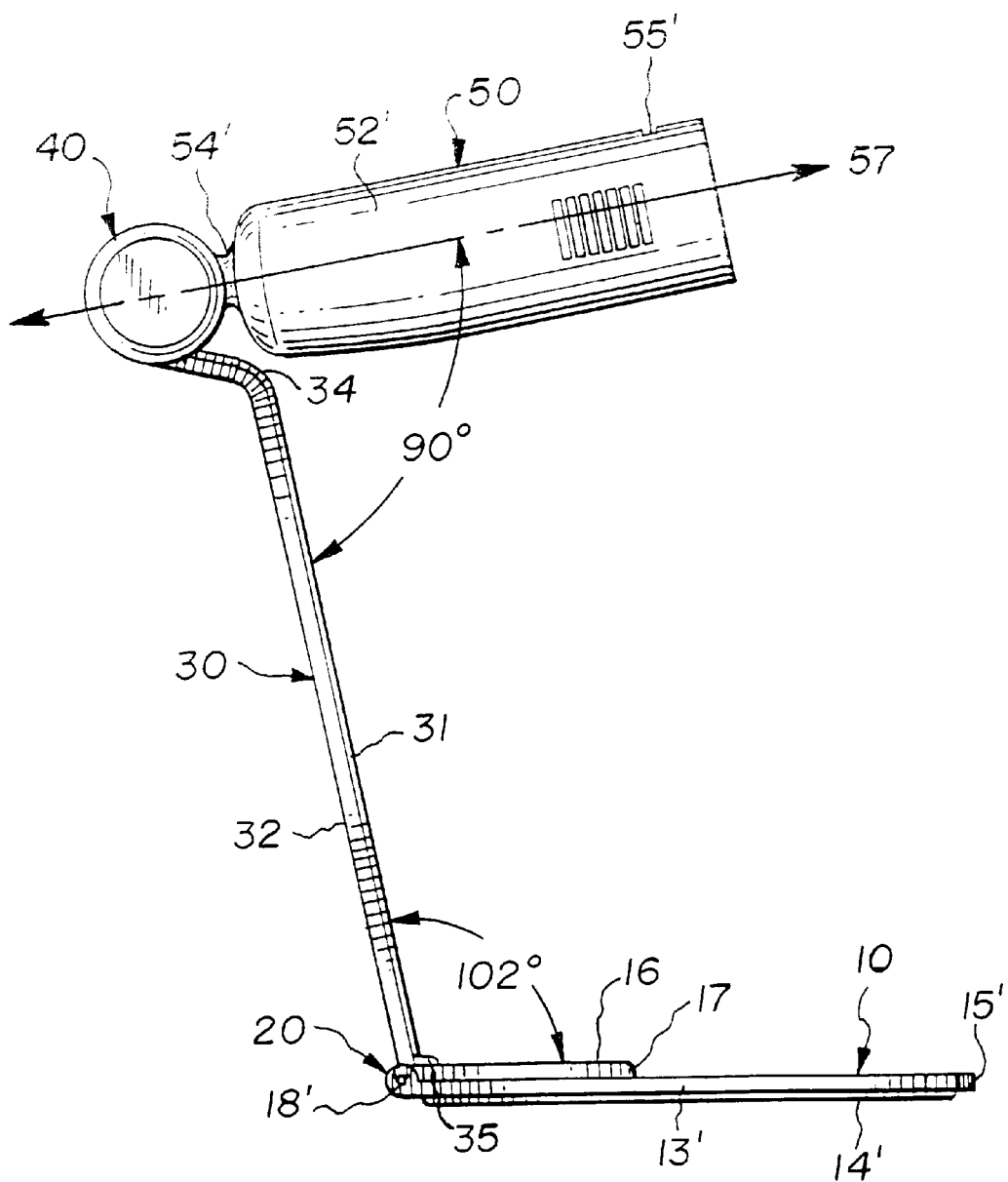
FIG. 2 is a right side elevational view of the stand in the horizontal position.
Figure 3:
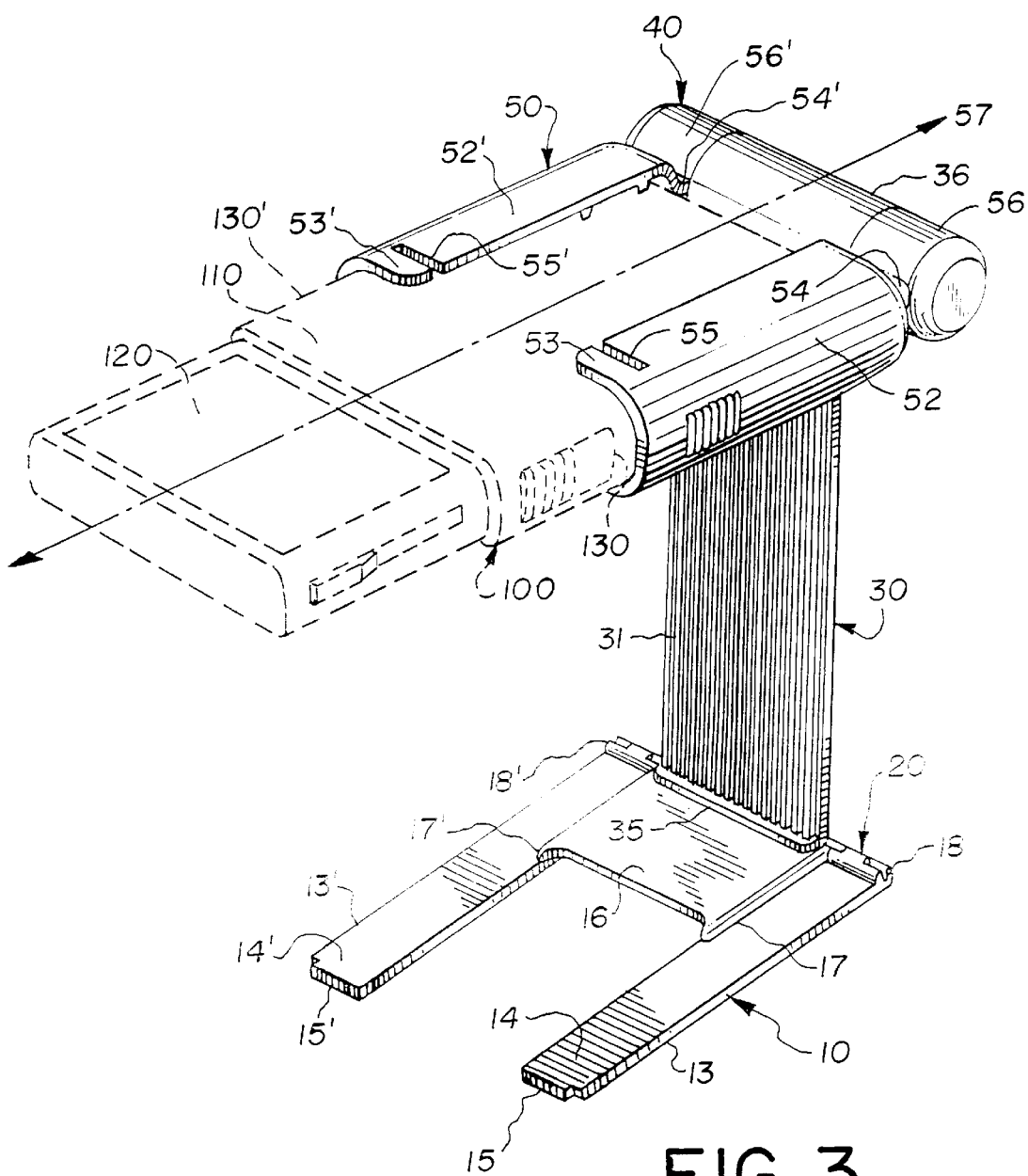
FIG. 3 is a perspective view of the stand assembled in horizontal position showing in dotted lines an example of a magnifier with the magnifying lens extended.

FIGS. 1–3 illustrate the stand with the magnifier in a horizontal position which allows the user to view objects from directly above the magnifier. As used in this context, horizontal position essentially refers to positioning the magnifier 180±30° to the viewing surface, preferably 180±15°. As seen in FIG. 1, base plate 10 consists of 2 support legs 13, 13' and bridging member 16. Base plate 10 is preferably formed such that the central portion between legs 13, 13' is open for a larger viewing area than that of the object to be examined. Support legs 13, 13' are spaced on opposite sides of base plate 10 to provide stability. Support legs 13, 13' extend from hinge ends 18, 18' and integrally form ends 14, 14'. Ends 18, 18' conventionally form a portion of hinge 20 and are preferably hollow, tubes through which a pintle or pin projects. While the preferred embodiment is shown, other conventional hinges may also be used. Ends 14, 14' project in a manner such that edges 15, 15' form a surface which can be mated with slot 55, 55' of magnifier holder 50, as will be further described in the discussion of the easel position of FIGS. 4–6. In the particular embodiment of FIG. 1, the outer, opposite edges of bridging member 16 lies on top of the inner portion of legs 13, 13', forming ledge 17 which extends around three sides of member 16. Legs 13, 13' contact the surface upon which the stand rests while the sides of bridge member 16 rests on legs 13, 13'.

Supporting plate 30 joins base 10 and magnifier holder 50 at hinges 20 and 40 respectively. Plate 30 has side 31, side 32 (shown in FIG. 2), ledge 35 and shoulder 34 which projects away from side 31 to form central portion 36 of hinge 40. Additionally, the width between the outer edges of plate 30 is such that it is slightly less than the distance between support legs 13, 13', i.e., plate 30 can fit into the space between legs 13, 13'. When the stand is being used with the magnifier in the horizontal position as in FIG. 3, ledge 35 of side 31 contacts bridging member 16 forming a "stop" which keeps plate 30 in an upright position. As seen in FIG. 2, when the magnifier stand is in the horizontal position, supporting plate 30 preferably forms a perpendicular or obtuse (greater than 90°) angle with base 10. At the opposite end of plate 30, hinge 40 has a conventional cylinder-type hinge mechanism, the interior mechanism of which includes ribs which temporarily lock the hinge into various positions. It will be understood by the skilled artisan that other types of hinges can also be employed. In the horizontal or parallel position, plate 30 preferably forms a 90° angle with central axis 57 of magnifier holder 50. In the preferred embodiment, the obtuse angle formed by base plate 10 and supporting member 30 is approximately 102° and the angle formed between magnifier holder 50 and supporting member 30 is 90°.

As seen in FIG. 1, magnifier holder 50 consists of two channeled arms 52, 52' formed so as to hold a compact magnifier 100. Arms 52, 52' have open ends 53, 53' and ribs 58, 58' (58' seen in FIG. 4). Referring to the embodiments of FIG. 3, magnifier 100 is slidably inserted into arms 52, 52' and frictionally held until removed. Ribs 58, 58' (58' seen in FIG. 4) help in grasping magnifier holder 50. Ends 53, 53' have slots 55,55' which will be described in the section which discusses the easel position. Arms 52, 52' are joined to hinge portions 56, 56' by necks 54, 54' respectively. Hinge portions 56, 56' are conventionally joined to central portion 36 of plate 30 to form hinge 40.

Magnifier 100 is of conventional design (shown in FIG. 3 in dotted lines) and includes a generally rectangular housing 110 of a size enabling it to be held in the user's hand. Rectangular housing 110 has a longitudinal axis extending along the central axis 57 of the housing, and a minor axis transverse to the longitudinal axis. In the illustrated embodiment, the magnifier 100 represents a hand-holdable lighted magnifier having a generally rectangular magnifying lens 120. In the preferred embodiment, magnifier 100 is a magnifier with a retractable lens commonly called a pop-up or compact magnifier. By way of example, U.S. Pat. No. 5,754,349 to Hon discloses such a magnifier. Edges 130, 130' of magnifier 100 are of a shape such that they matingly engage arms 52, 52' of magnifier holder 50. In the preferred embodiment, arms 52, 52' have been slightly flared as to receive a magnifier with rectangular housing 110 that slightly increases toward the central portion. When magnifier lens 120 is extended, housing 110 is fixed directly over base 10 with the lens 120 extending beyond. Preferably, when looking directly downward through lens 120, legs 13, 13' are not immediately visible. The user has a clear, uninterrupted view of the area directly below lens 120.

Figure 4:
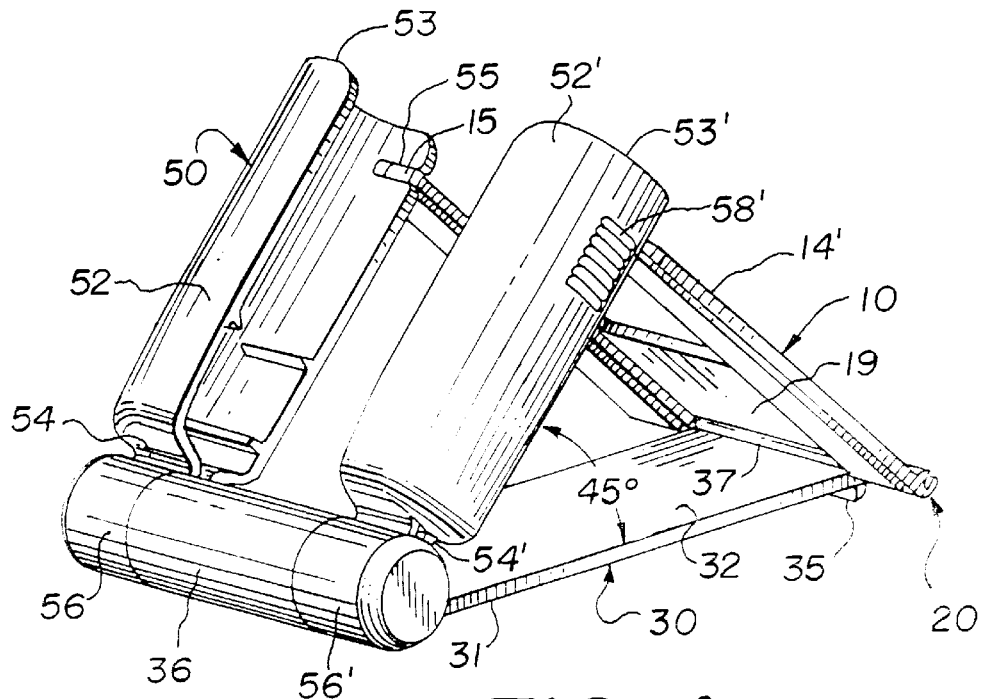
FIG. 4 is a perspective view of the stand assembled in the easel position.
Figure 5:
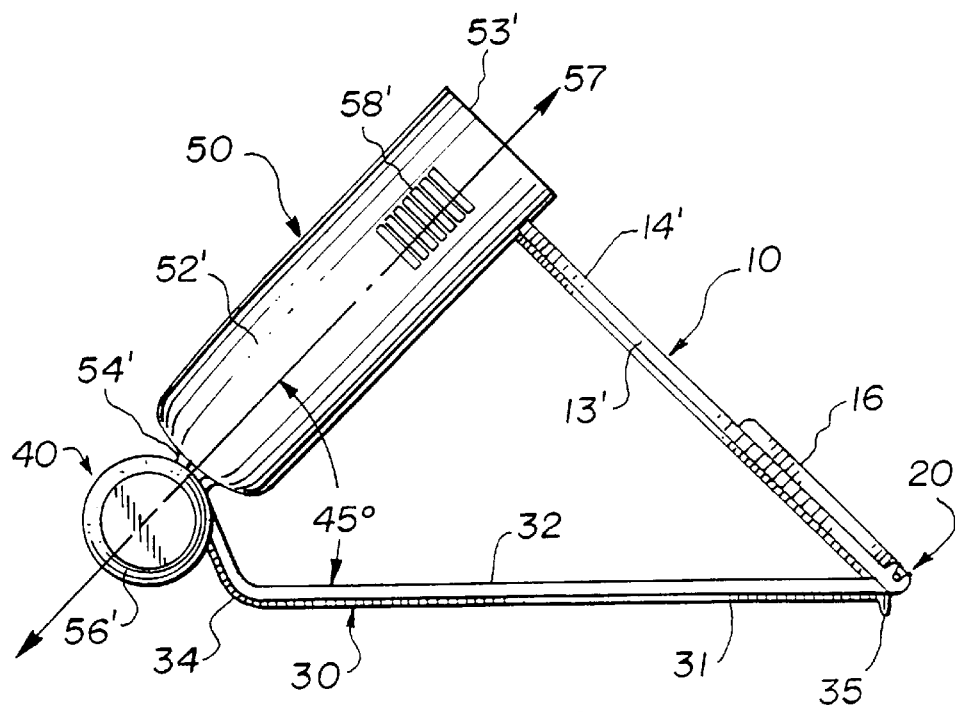
FIG. 5 is a right side elevational view of the stand in the easel position.
Figure 6:
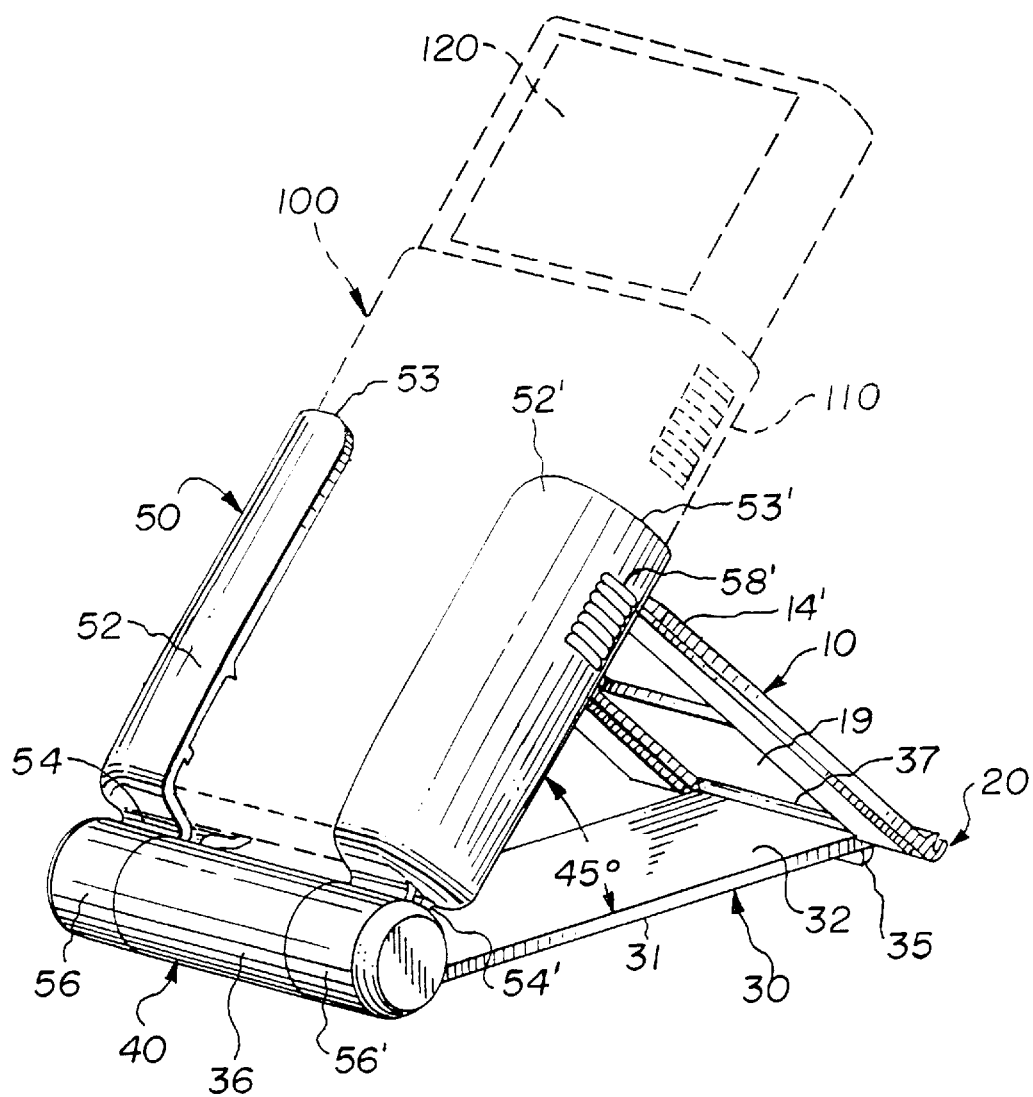
FIG. 6 is a perspective view of the stand assembled in the easel position showing in dotted lines an example of a magnifier with the magnifying lens extended.

FIGS. 4–6 illustrate the frame in an easel position which angles the magnifying device at an acute (less than 90°) angle, preferably 45°, to the surface upon which it sits. As seen in FIG. 5, base 10, supporting plate 30 and magnifier holder 50 have been positioned such that shoulder 34 and ledge 35 of supporting plate 30 now contacts the surface that the stand sits upon. Side 32 faces upward while side 31 faces downward.

In FIG. 4, supporting plate 30 has been rotated around hinge 20 such that side 32 contacts underside 19 of bridging member 16 at junction 37. Magnifier holder 50 has been rotated around hinge 40 such that the two parts are aligned at an acute angle, preferably 45°. As previously mentioned, ledge 35 and shoulder 34 of supporting plate 30 lay on the surface, providing enough length and width to balance and stabilize the stand. This is important once the magnifier is inserted, especially if the magnifier extends over the stand. In the preferred embodiment, a pop-up magnifier is used which adds height and a certain weight distribution to the stand. It is important to the user that the magnifier be balanced and not tip over during the course of use.

Leg edges 15, 15' of base plate 10 are inserted into slots 55, 55' of magnifier holder 50 to lock and secure the stand in an easel position. As seen in FIG. 4, slots 55, 55' (55' not shown) are cutaway sections formed to be open toward the inside of the stand and not to extend around arms 52, 52'. In the preferred embodiment, slots 55, 55' are close to edges 53, 53' but other embodiments may have other engagement means. Ribs or multiple slots may be spaced at regular intervals along arms 52, 52'. Leg edges 15, 15' insert and frictionally lock into slots 55, 55'. As seen in FIG. 5, hinge 20 has a diameter which is greater than the thickness of base plate 10 as will be described in more detail in the discussion of FIGS. 7–9. In FIG. 6, magnifier 100 (dotted lines) has been inserted into magnifier holder 50 with housing 110 engaged by arms 52, 52'. While not shown, leg edges 15, 15' may contact magnifier 100 when engaged in slots 55, 55'. When lens 120 is in the extended position, the user may view objects from a normal sitting position with the magnifier and stand located on a tabletop or desk. Having the magnifier in the easel position additionally allows the user to manipulate objects while viewing them through the magnifier lens. Since the magnifier is in a balanced, stationary position, the user is also able to use his/her hands to bring the objects closer, turn them over, etc.

Figure 7:
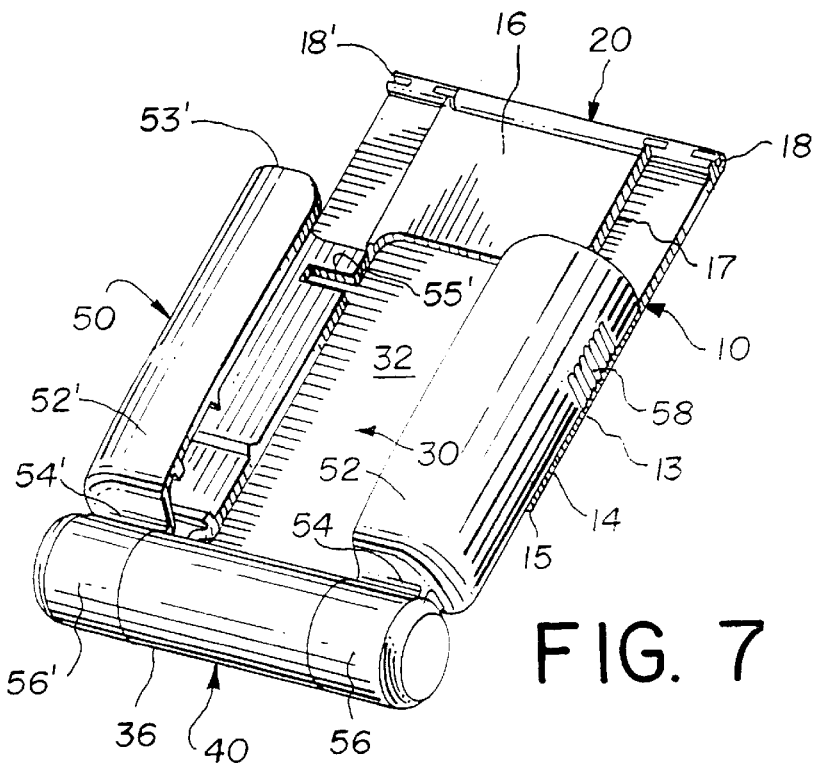
FIG. 7 is a perspective view of the stand assembled in the collapsed position.
Figure 8:
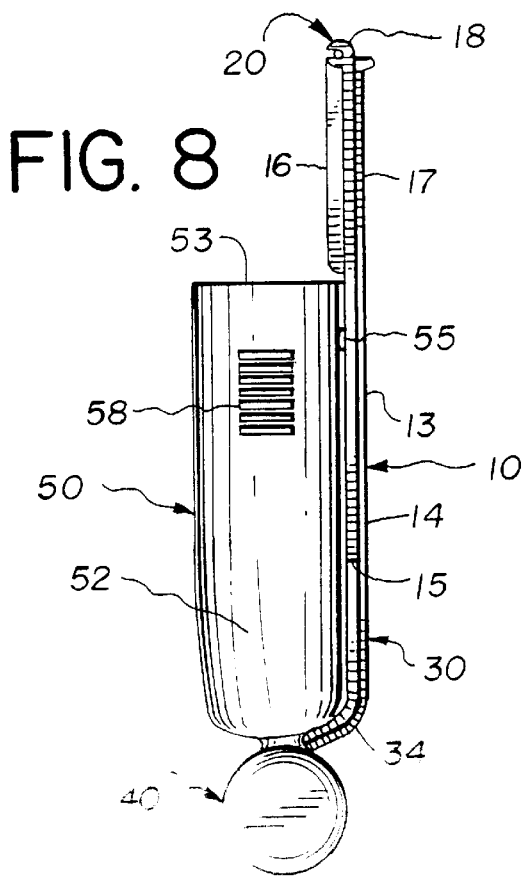
FIG. 8 is a right side elevational view of the stand in the collapsed position.
Figure 9:
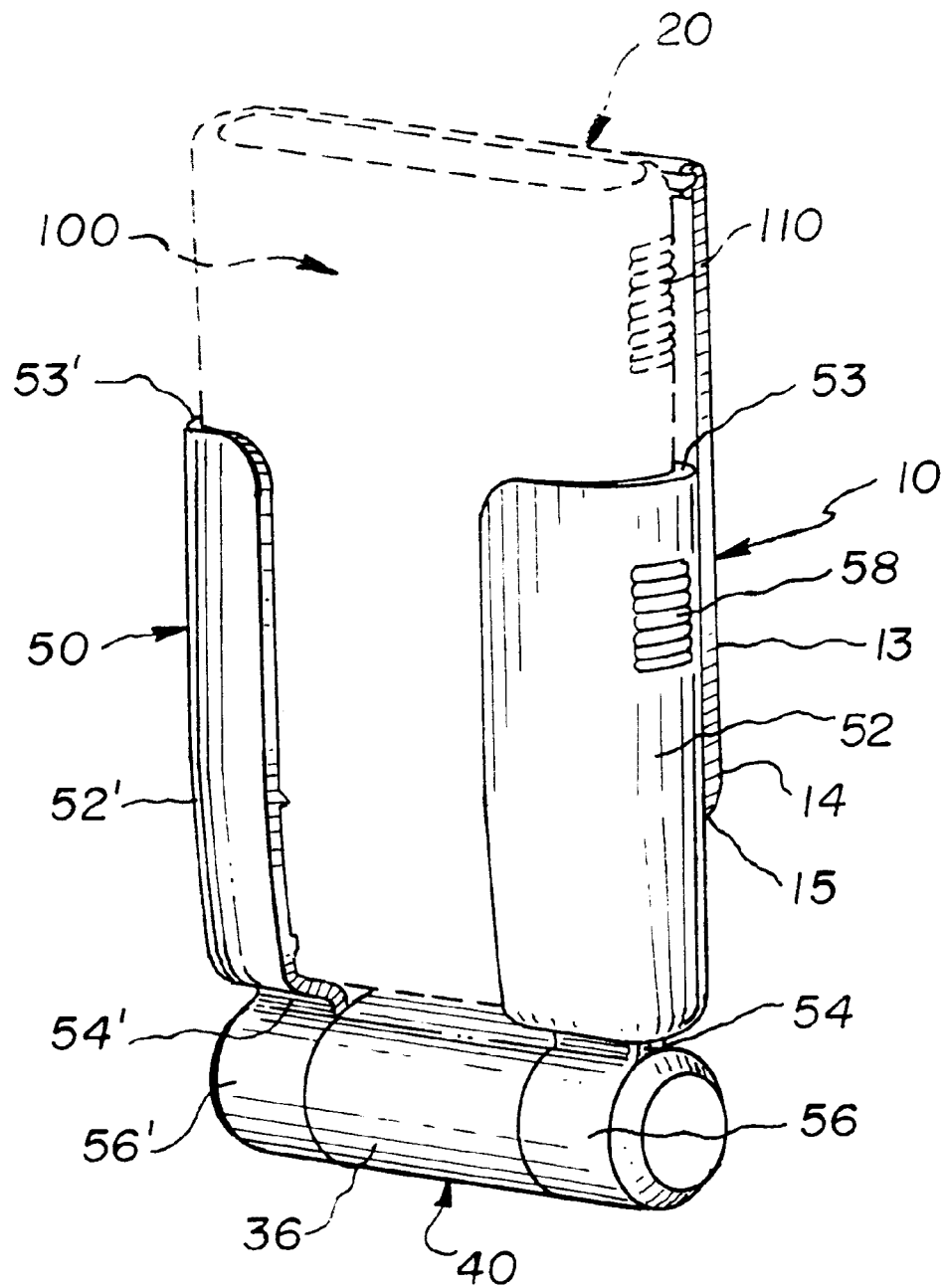
FIG. 9 is a perspective view of the stand assembled in the collapsed position showing in dotted lines an example of a magnifier with the magnifying lens extended.

FIGS. 7–9 show the stand collapsed into a flat, compact configuration for travel or storage and the like for hand use. Referring to FIG. 7, base plate 10 has been rotated approximately 260° with respect to FIG. 1 around hinge 20 such that side 32 of supporting member 30 contacts the underside of bridging member 16. As hinge 20 has the same diameter as plate base 10, supporting member 30 lays with the area of legs 13, 13' and forms a flat surface as seen in FIG. 8.

Referring to FIG. 7 again, magnifier holder 50 rotates 270°, with respect to FIG. 1, around hinge 40. Arms 52, 52' contacts support legs 13, 13'. As seen in FIG. 9, inserting magnifier 100 into holder 50, extends housing 110 parallel to base 10. When the lens 120 of magnifier 100 is extended as in the magnifier of in FIG. 3, the view through lens 120 is free from any interference from the stand. The stand may act as a handle and allow the user to use the magnifier as a hand held magnifier.

The foregoing has been provided so that the nature of the invention may be understood easily. It should, however, be apparent that modifications of the foregoing embodiments may be made without departing from the nature and scope of the invention. For example, it is possible to modify the arms of the magnifier holder to hold a different shaped magnifier with or without a retractable lens or to reconfigure the base plate or to provide various conventional mechanisms for rotation or engagement. Accordingly, the scope of the invention should not be limited to the specifics described above but instead should be measured with respect to the appended claims.

What is claimed is:

1. An apparatus for magnifying an object, comprising:
   a) a magnifying device comprising a magnifying lens and a means for manually holding the lens;
   b) a magnifier holder comprising two channeled arms for securely retaining the magnifying device, which arms are movably connected to a first hinge assembly;
   c) a supporting member connected at one end to the first hinge assembly, which first hinge assembly can rotate the supporting member at least 270 degrees with respect to the magnifier holder arms, and which supporting member is connected at the other to a second hinge assembly; and
   d) a base plate comprising two flat legs, said base plate rotatably connected to the second hinge assembly,
   such that the apparatus can position the magnifying device parallel and above the viewing surface by resting the legs of the base plate on a viewing surface, positioning the support member substantially vertical to the viewing surface, whereby the arms of the magnifier holder is positioned substantially perpendicular to the supporting arm and parallel to the flat legs, and
   such that the apparatus can position the magnifying device in an easel position by rotating the arms of the magnifier holder and the legs of the base plate more than 180 degrees, respectively clockwise and counterclockwise towards each other so the ends of the legs matingly engage the arms of the magnifier holder, whereby the supporting plate lies along the viewing surface and the legs of the base plate support the magnifier holder at an acute angle to the viewing surface; and
   such that the apparatus can collapse to a compact form for storage or manual manipulation by collapsing the easel position such that the base plate lies on top of the supporting member and the magnifier holder lies on top of the base plate.

2. The apparatus for magnifying an object of claim 1, wherein said magnifying device contains a retractable lens.

3. The apparatus for magnifying an object of claim 1, wherein said magnifying device is a magnifier which is integral to said magnifier holder.

4. An apparatus for positioning and holding a magnifying device, having a magnifying lens, comprising:
   a) a magnifier holder comprising two channeled arms for securely retaining the sides of the magnifying device, which arms are movably connected to a first hinge assembly;
   b) a supporting member connected at one end to the first hinge assembly, which first hinge assembly can rotate the supporting member at least 270 degrees with respect to the magnifier holder arms, and which supporting member is connected at the other to a second hinge assembly; and
   c) a base plate comprising two flat legs, said base plate rotatably connected to the second hinge assembly,
   such that the apparatus can position the magnifying device parallel and above the viewing surface by resting the legs of the base plate on a viewing surface, positioning the supporting member substantially vertical to the viewing surface whereby the arms of the magnifier holder is positioned substantially perpendicular to the supporting arm and substantially parallel to the flat legs, and
   such that the apparatus can position the magnifying device in an easel position by rotating the arms of the magnifier holder and the legs of the base plate more than 180 degrees, respectively, clockwise and counterclockwise towards each other so the ends of the legs matingly engage the arms of the magnifier holder, whereby the supporting member lies along the viewing surface and the legs of the base plate support the magnifier holder at an acute angle to the viewing surface.

5. The apparatus of claim 4, wherein said legs of said base plate comprises ends which matingly engage said arms.

6. The apparatus of claim 5, wherein said arms have slots for matingly engaging ends of said legs.

7. The apparatus of claim 4, whereby the lens of the magnifying device which can be retracted within the magnifying device or extended by action of spring mechanism.

8. An apparatus for positioning and holding a magnifying device, comprising:
   a) a magnifier holder comprising two channeled arms for securely retaining the sides of the magnifying device, which arms are movably connected to a first hinge assembly;
   b) a supporting member connected at one end to the first hinge assembly, which first hinge assembly can rotate the supporting member at least 270 degrees with respect to the magnifier holder arms, and which supporting member is connected at the other to a second hinge assembly; and
   c) a base plate comprising two flat legs, said base plate rotatably connected to the second hinge assembly,
   such that the apparatus can position the magnifying device parallel and above the viewing surface by resting the legs of the base plate on a viewing surface, positioning the support member substantially vertical to the viewing surface whereby the arms of the magnifier holder is positioned about perpendicular to the supporting arm and substantially parallel to the flat legs, and
   such that the apparatus can position the magnifier holder in an easel position by rotating the arms of the magnifier holder and the legs of the base plate more than 180 degrees, respectively clockwise and counterclockwise towards each other so the ends of the legs matingly engage the arms of the magnifier holder, whereby the supporting plate lies along the viewing surface and the legs of the base plate support the magnifier holder at an acute angle to the viewing surface; and
   such that the apparatus can collapse to a compact form for storage or manual manipulation by collapsing the easel position such that the base plate lies on top of the supporting member and the magnifier holder lies on top of the base plate.

9. The apparatus of claim 8, wherein said supporting member forms a flat surface with said legs when said apparatus is collapsed to said compact form.

10. The apparatus of claim 8, wherein the supporting member has a shoulder adjacent to first hinge such that when the apparatus is collapsed, the supporting member lies parallel to the magnifying device.

* * * * *